(12) United States Patent
Ayarturk

(10) Patent No.: US 12,368,362 B2
(45) Date of Patent: Jul. 22, 2025

(54) ELECTRICITY GENERATOR

(71) Applicant: REPG ENERJI SISTEMLERI SANAYI VE TICARET ANONIM SIRKETI, Bursa (TR)

(72) Inventor: Hasan Ayarturk, Istanbul (TR)

(73) Assignee: REPG ENERJI SISTEMLERI SANAYI VE TICARET ANONIM SIRKETI, Bursa (TR)

(*) Notice: Subject to any disclaimer, the term of this patent is extended or adjusted under 35 U.S.C. 154(b) by 126 days.

(21) Appl. No.: 18/039,494

(22) PCT Filed: Sep. 10, 2021

(86) PCT No.: PCT/TR2021/050921
§ 371 (c)(1),
(2) Date: May 31, 2023

(87) PCT Pub. No.: WO2022/146312
PCT Pub. Date: Jul. 7, 2022

(65) Prior Publication Data
US 2024/0022158 A1 Jan. 18, 2024

(30) Foreign Application Priority Data
Dec. 29, 2020 (TR) .................. 2020/22306

(51) Int. Cl.
*H02K 44/08* (2006.01)

(52) U.S. Cl.
CPC .................. *H02K 44/085* (2013.01)

(58) Field of Classification Search
CPC ...... H02K 44/08; H02K 44/085; H02K 44/10; H02K 44/12; H02K 44/14
(Continued)

(56) References Cited

U.S. PATENT DOCUMENTS

| | | | | | |
|---|---|---|---|---|---|
| 3,294,989 | A | * | 12/1966 | Eichenberger | ....... H02K 44/085 310/11 |
| 3,395,967 | A | * | 8/1968 | Claude | .................. H02K 44/08 310/11 |

(Continued)

FOREIGN PATENT DOCUMENTS

| | | | | |
|---|---|---|---|---|
| CN | 104578682 A | | 4/2015 | |
| EP | 1396690 A1 | * | 3/2004 | ............. F24V 40/00 |

(Continued)

OTHER PUBLICATIONS

Machine translation Nei et al. JP 03226262 A (Year: 1991).*

*Primary Examiner* — Burton S Mullins
(74) *Attorney, Agent, or Firm* — Bayramoglu Law Offices LLC

(57) ABSTRACT

An electricity generator includes at least one chamber wherein the pressured solution and air mixture, which can be taken therein by means of at least one input opening, can be centrifuged; at least one first output opening provided for discharging of the solution, which can be separated from the air by means of centrifuging of the mixture on the chamber and which is brought to equal vapor pressure as the air vapor pressure; and at least one second output opening provided for discharging of the air separated from the solution which exists in the mixture. In order to enable electricity generation, the electricity generator further includes at least one magnet which can create magnetic field in the chamber, at least one first electrode positioned in the vicinity of the input opening, and at least one second electrode positioned in the vicinity of the first output opening.

4 Claims, 2 Drawing Sheets

(58) Field of Classification Search
USPC .......................................................... 310/11
See application file for complete search history.

(56) References Cited

U.S. PATENT DOCUMENTS

| | | | | |
|---|---|---|---|---|
| 3,432,694 | A | * 3/1969 | Bidard | .................... H01J 45/00 |
| | | | | 310/11 |
| 3,449,601 | A | 6/1969 | Tipton | |
| 4,465,964 | A | * 8/1984 | Cover | .................. H02K 44/085 |
| | | | | 310/11 |
| 5,305,610 | A | * 4/1994 | Bennett | ................ F25J 3/04636 |
| | | | | 62/910 |
| 7,061,129 | B2 | * 6/2006 | Perlo | .................... H02K 44/085 |
| | | | | 310/11 |
| 2004/0168716 | A1 | * 9/2004 | Gritskevich | .............. F25B 9/04 |
| | | | | 136/205 |
| 2005/0167987 | A1 | 8/2005 | Perlo et al. | |
| 2010/0109342 | A1 | 5/2010 | Oleynik et al. | |
| 2014/0023886 | A1 | * 1/2014 | Mastena | ........... H01M 8/04156 |
| | | | | 74/DIG. 9 |

FOREIGN PATENT DOCUMENTS

| | | | | |
|---|---|---|---|---|
| JP | 03226262 | A | * 10/1991 | ............. H02K 44/12 |
| RU | 127544 | U1 | 4/2013 | |
| WO | 8302693 | A1 | 8/1983 | |

\* cited by examiner

ELECTRICITY GENERATOR

CROSS REFERENCE TO THE RELATED APPLICATIONS

This application is the national phase entry of International Application No. PCT/TR2021/050921, filed on Sep. 10, 2021, which is based upon and claims priority to Turkish Patent Application No. 2020/22306, filed on Dec. 29, 2020, the entire contents of which are incorporated herein by reference.

TECHNICAL FIELD

The present invention relates to an electricity generator which can generate electricity depending on passage of a conductive solution through magnetic field.

BACKGROUND

Magneto hydrodynamic (MHD) power generation is based on direct generation of electrical energy by means of a conductive fluid without any intermediate mechanical energy transformation. While traditional generators or alternators comprise conductive copper winding, a conductor, hot ionized gas or a liquid conductor are used in a MHD generator.

Magnetic hydrodynamic generators need a conductive flow. This conductive fluid is essentially plasma. As the plasma, transformation of air into plasma form is utilized. This means a very high temperature. However, this condition can only be generated in nuclear plants. Thus, it does not function in an efficient manner in systems which have lower temperatures. In closed plasma cycles, high temperature and high speed values are needed. The efficiencies of systems which function by means of liquid metal and similar conductors are very low. The application with number RU127544U1 known in the art relates to magneto hydrodynamic electricity generation system comprising a casing, at least one nozzle for providing water or water vapor to the inlet of said nozzle and at least two MHD generators, where each of them are made in a Laval nozzle form. When this application known in the art is examined, said electricity generation takes place at the instant where the plasma temperature is nearly 6000° C. However, designing of such type of system and reaching of such high temperatures are costly and less applicable in the art, and it can only take place as a result of the effect of very big exothermic chemical reactions or nuclear explosions. Therefore, the usability and the proliferation of this technical advantage are low.

As a result, because of the abovementioned problems, an improvement is required in the related technical field.

SUMMARY

The present invention relates to an electricity generator, for eliminating the abovementioned disadvantages and for bringing new advantages to the related technical field.

An object of the present invention is to provide an electricity generator which can generate electricity by means of a conductive solution and which can provide regeneration of the solution at the same time.

In order to realize the abovementioned objects and the objects which are to be deducted from the detailed description below, the present invention is an electricity generator which can generate electricity depending on passage of a conductive solution through magnetic field. Accordingly, the improvement is that the subject matter electricity generator comprises at least one chamber wherein the pressurized solution and air mixture, which can be taken therein by means of at least one input opening, can be centrifuged, at least one first output opening provided for discharging of the solution, which can be separated from the air by means of centrifuging of the mixture on the chamber and which is brought to a vapor pressure that is equal to the air vapor pressure, at least one second output opening provided for discharging of the air separated from the solution which exists in the mixture, and in order to enable electricity generation; the subject matter electricity generator comprises at least one magnet which can create magnetic field in said chamber, at least one first electrode positioned in the vicinity of said input opening, and at least one second electrode positioned in the vicinity of said first output opening. Thus, a structure is obtained which can provide regeneration of the solution and which can provide generation of electricity from this solution.

In a possible embodiment of the present invention, the input opening has at least one solution input part which can obtain pressurized solution, and at least one air input part which can obtain air. Thus, solution-air mixture is taken into the chamber without consuming an extra energy depending on the solution pressure.

In another possible embodiment of the present invention, the first electrode and the second electrode are associated with at least one energy generation unit. Thus, the voltage which exists at the electrodes becomes usable.

In another possible embodiment of the present invention, at least one container compartment connected to the chamber. Thus, the pressure of the centrifuged solution is balanced according to air pressure before the discharge of the centrifuged solution.

REFERENCE NUMBERS IN THE FIGURES

Figure 1:
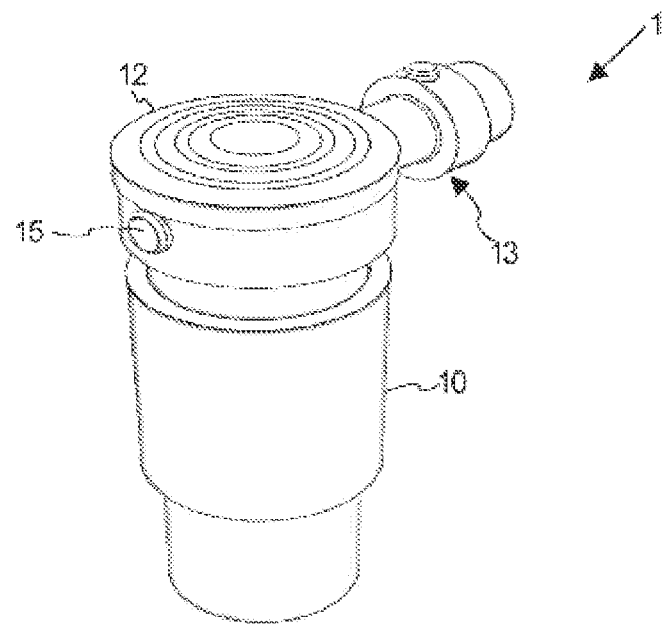
FIG. 1 shows a representative perspective view of the subject matter electricity generator.

1 Electricity generator
10 Chamber
11 Base
12 Cover
13 Input opening
131 Solution input part
132 Air input part
14 First output opening
15 Second output opening
16 Container compartment
20 Magnet
21 First electrode
22 Second electrode
30 Energy generation unit

DETAILED DESCRIPTION OF THE EMBODIMENTS

In this detailed description, the subject matter is explained with references to examples without forming any restrictive effect only in order to make the subject more understandable.

In FIG. 1, a representative perspective view of the subject matter electricity generator (1) is given. The subject matter electricity generator (1) essentially has a structure which generates electricity by means of a hydrodynamic method. The electricity generator (1) essentially generates electricity depending on the movement of a solution, having conductivity, in the magnetic field, and moreover, said electricity generator (1) provides regeneration of this solution. Regeneration of the solution means that the air, where said solution exists, has vapor pressure which is equal to the vapor pressure of the solution which exists at a specific time. When the solution stays in an open medium, said solution has vapor pressure which is equal to the vapor pressure of the medium where said solution exists. However, since this duration is long and since the vapor pressures between day/night and the relative humidity are different, obtaining of vapor pressure so as to have the desired vapor pressure becomes difficult. Therefore, as the regeneration process is applied to the solution at different times, the solution having different vapor pressures can be obtained. This process may be needed to be applied due to different reasons in the art.

In generation of electricity by means of hydrodynamic method, there is the principle of moving a conductive solution in magnetic field and forming a closed circuit and transforming movement of solution into electrical energy. The subject matter electricity generator (1) has a structure which provides generation of electricity from one side and regeneration of the solution from the other side.

Figure 2:
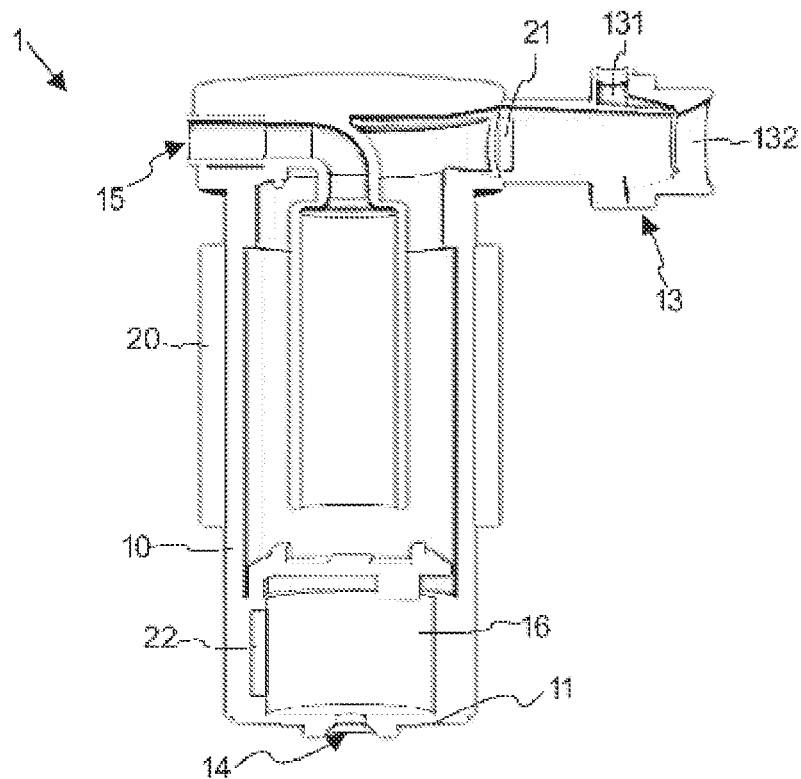
FIG. 2 shows a representative cross-sectional view of the subject matter electricity generator.

In FIG. 2, a representative cross-sectional view of the subject matter electricity generator (1) is given. Accordingly, the electricity generator (1) has at least one chamber (10) wherein the solution can be positioned. Said chamber (10) essentially has a cylindrical shape and there is a base (11) section at one side thereof and there is at least one cover (12) section at the other side thereof. Since the chamber (10) has a cylindrical shape, centrifuging (the advantages thereof will be described below) of the solution is provided. On the chamber (10), there is at least one input opening (13) and at least one first output opening (14) and at least one second output opening (15).

Said input opening (13) provides entering of the solution-air mixture into the chamber (10). The input opening (13) is essentially positioned in the vicinity of the cover (12) of the chamber (10). There is an air input part (132) and a solution input part (131) on the chamber (10) input. There is stationary air at said air input part (132). Pressurized solution can enter the input opening (13) through said solution input part (131). As the solution is given to the input opening (13) in a pressurized form, air suctioning is provided naturally through the air input part (132). This condition is an example for the venturi principle. The pressurized solution air mixture, which enters the chamber (10) through the input opening (13), rotates around the cylindrical shaped chamber (10) and falls downwardly. In this case, the solution-air mixture is moved to the walls of the chamber (10) by means of centrifuge effect.

Air and solution in the solution-air mixture are separated from each other by means of the effect of centrifuge. The solution separated from the air can be discharged outwardly through at least one first output opening (14) provided essentially in the periphery of the base (11) of the chamber (10). Due to this, the vapor pressure of the discharged solution is equalized to the air vapor pressure by giving vapor to the air or by taking vapor from the air during centrifuge. In a possible embodiment of the present invention, at least one container compartment (16) at the base (11) of the chamber (10) is the part where the solution is contained before the discharge through the first output opening (14). The vapor pressure of the contained solution can realize the function of balancing in order to provide equalization to the air vapor pressure by giving vapor to the air or by taking vapor from the air during centrifuge. The air, separated from the solution as a result of centrifuge, can be discharged outwardly by means of the second output opening (15) provided essentially in the vicinity of the cover (12) of the chamber (10).

Figure 3:
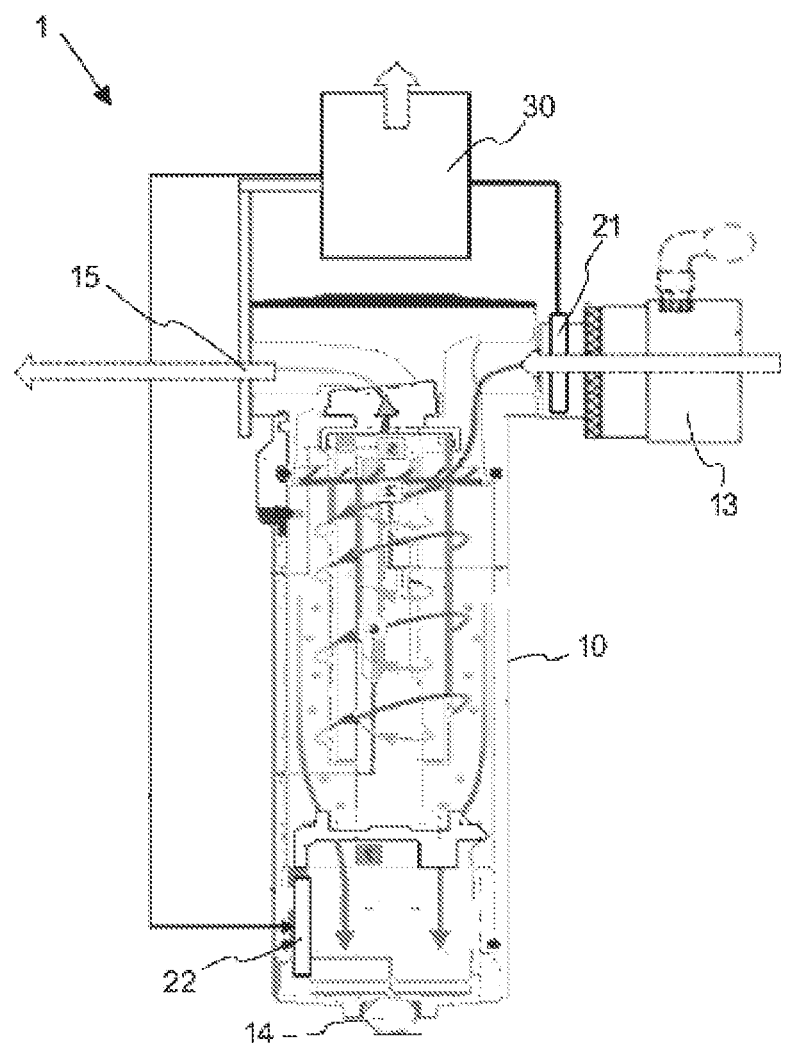
FIG. 3 shows a representative schematic view of the subject matter electricity generator.

In FIG. 3, a representative schematic view of the subject matter electricity generator (1) is given. Accordingly, the chamber (10) is associated with at least one magnet (20). Said magnet (20) essentially creates magnetic field into the chamber (10) such that the solution is affected. The magnet (20) can be provided at the inner part of the chamber (10) or can be provided at the outer part of the chamber (10) in a manner encircling said chamber (10). In a possible embodiment of the present invention, the magnet (20) can be static neodymium magnet (20) or can be direct current electro-magnet or alternative current electro-magnet. In order to form a closed-circuit by means of the magnet (20), at least one first electrode (21) and at least one second electrode (22) are positioned on the chamber (10). The first electrode (21) is essentially positioned in the vicinity of the input opening (13) and is in contact with the solution. The second electrode (22) is positioned in the vicinity of the first output opening (14) and is in contact with the fluid solution. The solution, pressurized and moved in the chamber (10) by means of this, is ionized and provides electrical current. The first electrode (21) and the second electrode (22) are connected to at least one electricity generation unit (30). Said energy generation unit (30) transforms the voltage difference, which exists in the electrodes, into electricity. The energy generation unit (30) can comprise components which provide rectification of the obtained current and passing thereof through various processes.

In alternative embodiments, the gas obtained from the electricity generator (1) can be hydrogen gas. While electricity is being produced with a water-based solution, water is ionized since electricity passes through it and hydrogen gas is output. Hydrogen gas can be used as fuel. In different alternative embodiments, by ionizing and at the same time regenerating of the solution, it can be used in chlorine production processes or in changing the chemical structures of salts.

By means of all these embodiments, air and solution, which is mixed with air, can be separated from each other and by means of this, regeneration of the solution can be provided without needing high temperature and high pressure. Thanks to the usage of this solution in the generation of hydrodynamic electricity, the need for molten metals or liquid metals, used in hydrodynamic electricity generation as known in the art, is eliminated. The electricity generator (1) has two different outputs, and thereby it has high efficiency and it is environment-friendly.

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

What is claimed is:

1. An electricity generator, configured to generate electricity depending on passage of a conductive solution through a magnetic field, and comprising:

at least one chamber, wherein a pressurized solution and air mixture is taken in the at least one chamber by at least one input opening, and the pressurized solution and air mixture is allowed to be centrifuged, at least one first output opening provided for discharging of the solution, wherein the solution is brought to a vapor pressure that is equal to an air vapor pressure, and at least one second output opening provided for discharging of air separated from the solution;

in order to enable electricity generation, the electricity generator further comprises:

at least one magnet, wherein the at least one magnet at least partially encloses the at least one chamber and is configured to create the magnetic field in the at least one chamber, wherein during operation of the electricity generator, the electricity generator is configured such that solution of the pressurized solution and air mixture is separated from and encloses air of the pressurized solution and air mixture due to centrifuging of the pressurized solution and air mixture in a region of the chamber that is at least partially enclosed by the at least one magnet, at least one first electrode positioned in vicinity of the at least one input opening, and at least one second electrode positioned in vicinity of the at least one first output opening.

2. The electricity generator according to claim 1, wherein the at least one input opening has at least one solution input part configured to obtain pressurized solution, and at least one air input part configured to obtain air.

3. The electricity generator according to claim 1, wherein the at least one first electrode and the at least one second electrode are associated with at least one energy generation unit.

4. The electricity generator according to claim 1, wherein at least one container compartment is provided where the at least one chamber is connected.

\* \* \* \* \*